United States Patent [19]

Heierli

[11] 4,278,075
[45] Jul. 14, 1981

[54] PROCESS AND DEVICE FOR THE RECUPERATION OF HEAT FROM SELECTED RANGES OF THE SOLAR SPECTRUM

[75] Inventor: Werner Heierli, Olten, Switzerland
[73] Assignee: Heliotherm AG, Basel, Switzerland
[21] Appl. No.: 959,877
[22] Filed: Nov. 13, 1978
[30] Foreign Application Priority Data
Nov. 18, 1977 [CH] Switzerland ............ 14219/77
[51] Int. Cl.³ .................................. F24J 3/02
[52] U.S. Cl. ........................ 126/445; 126/452; 126/900
[58] Field of Search ............ 126/900, 901, 449, 417, 126/419, 441

[56] References Cited
U.S. PATENT DOCUMENTS

| 2,439,553 | 4/1948 | Winn | 126/900 |
|---|---|---|---|
| 2,489,751 | 11/1949 | Candler | 126/417 |
| 3,939,819 | 2/1976 | Minardi | 126/900 |
| 4,005,583 | 2/1977 | Ramey | 126/900 |
| 4,047,518 | 9/1977 | Anderson | 126/900 |
| 4,097,311 | 6/1978 | Ishibashi et al. | 126/901 |
| 4,108,373 | 8/1978 | Chiapale et al. | 126/431 |
| 4,158,355 | 6/1979 | Spitzer | 126/901 |

FOREIGN PATENT DOCUMENTS

| 2608302 | 2/1976 | Fed. Rep. of Germany | 126/900 |
|---|---|---|---|
| 2725326 | 6/1977 | Fed. Rep. of Germany | 126/900 |
| 2356094 | 6/1976 | France | 126/900 |
| 52-17227 | 2/1977 | Japan | 126/900 |

Primary Examiner—Daniel J. O'Connor
Attorney, Agent, or Firm—Michael J. Striker

[57] ABSTRACT

A method of recuperating heat in the partial range of the solar radiation spectrum including the step of mixing variously colored organic pigments into a fluid circulated through a hollow body, said fluid further including an antifreezing medium which is non-corrosive to the hollow body.

6 Claims, 3 Drawing Figures

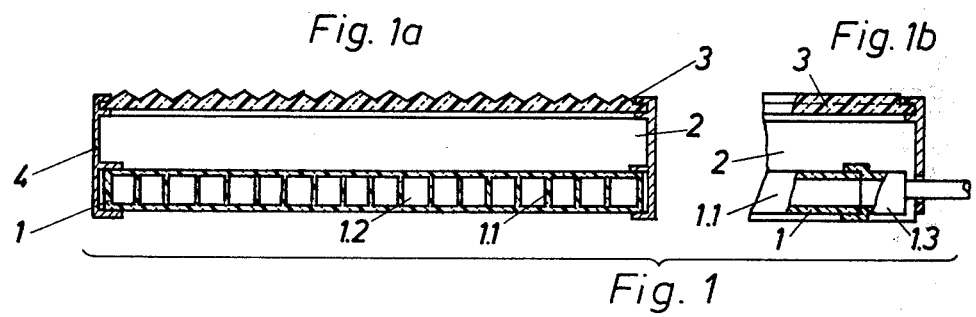
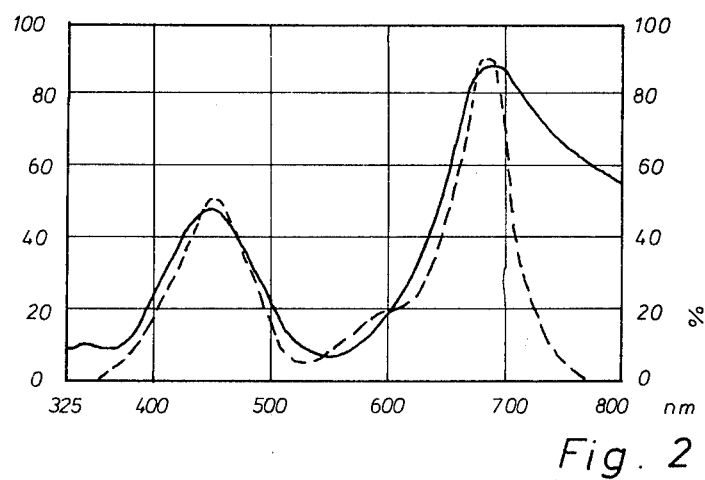
Fig. 2
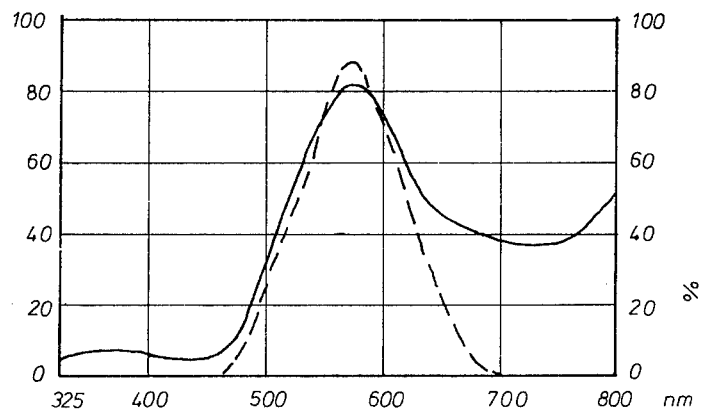
Fig. 3

PROCESS AND DEVICE FOR THE RECUPERATION OF HEAT FROM SELECTED RANGES OF THE SOLAR SPECTRUM

The invention concerns a process and devices for the recuperation of heat from at least one partial range of the spectrum of solar radiation, between wavelengths of 325 mm to 800 mm.

For the recuperation of heat from solar radiation, so-named solar collectors are known which, in the low-temperature range, consist in general of a black, light-absorbent plate, through which a heat-exchanging liquid (generally water) is circulated, whereby the heat-exchanging liquid dissipates the heat generated in the collector. The reverse side of the collector is heat-insulated to a good degree, and a transparent cover is arranged at a distance from the front side of the collector. Both features are incorporated to reduce heat loss.

Such solar collectors are also designated as flat collectors or, due to the black absorber plate, as black collectors. They are suitable for all applications where no light is required underneath the collector surface, as, for instance, on the roofs of structures or where insulating would not cause difficulties.

Photothermic energy-recuperation within the low-temperature range, would be of value also where sunlight is utilized either incompletely or not over its entire spectral range.

Considerable quantities of light and heat are required for greenhouses where, in the course of the day, energy demand does not coincide with then available energy. If a greenhouse were to be heated by energy derived from black collectors, the customary installation of the latter on the roof would deprive the plants of too large a quantity of light. Such black collectors would have to be located on open ground and would require a considerable area for erection. On the other hand, the maintenance of temperature in a greenhouse is of poor quality: On days when temperatures range from warm to hot, greenhouses of customary design must be shaded by mechanical means, thus reducing the entire light spectrum; and thus also depriving the plants of important partial ranges of the solar spectrum required for photosynthesis. On cool days, or during the night, the thermal insulation afforded by the glass panes enclosing the greenhouses is insufficient.

Similar considerations apply to swimming-pools and sports spaces located indoors; daylight of moderate intensity plays an important role here, both for the human eye and human comfort.

In European latitudes, the use of open-air pools is restricted to only a brief part of the day. Were black collectors to be erected for the recuperation of solar energy, this, too, would require considerable spaces on open ground.

In general, cases have been discussed here, where sunlight should be utilized in multiple ways or where, apart from energy recuperation, other utilizations of it should also be retained.

The invention is based upon the task of finding a process and devices of the solar-collector type, by which heat can be recuperated from sunlight, or which may be designed to allow so, also when daylight is required or desired underneath the collector system, or where the required heat insulation of the system can be accomplished only at great expenditure.

The solution of this task has been found in a process to recuperate heat from selected partial ranges of the solar spectrum, with a wavelength from 325 mm to 800 mm, utilizing a hollow body permeable to radiation, through which a liquid, preferably water, is circulated, the liquid selectively absorbing light within the predetermined partial range(s) by virtue of the admixture to the liquid of organic and/or inorganic light-proof color pigments in soluble form or in extremely fine distribution, whereby the liquid dissipates and transfers the recuperated heat through a closed circuit into a heat-storage vessel.

The color pigments must not be discolored by radiation over the entire spectral range, must not display variations due to aging nor accept electrostatic charges, as otherwise they would adhere to the walls of the elements forming the circuit. In non-soluble form, the pigments must be in particles of such fine size that they will not sedimentate even when the transporting liquid is in a state of stagnation. Concentration and mixing ratio of color pigments of various types can be adjusted so that the liquid flowing through the hollow body will be selectively absorbent within a predetermined portion of given partial ranges of the solar spectrum. the solar spectrum but remain permeable to light within other partial ranges. In this way, it will be possible to utilize both the biological functions, and the energy of daylight or sunlight, respectively.

Application of the process according to the invention, is economically warranted only if the required collectors can be provided and installed at suitable price levels. The invention proposes, therefore, to adapt the known construction of a flat collector, with an absorber plate set in a housing frame, having a cover permeable to radiation, and to develop the hollow body as hollow absorber plate, made of a material, preferably polycarbonates, permeable to light within the visible spectral range and the near UV- and IR-boundary range, and again representing a hollow body.

Moreover, a flat collector as per invention, provides the advantage, that the absorber plate can be drained outside of operating hours and also, that the collector, due to its low coefficient of heat conduction, will retain heat against the exterior at a value approximately equal to triple thermal glazing.

Developments of the design as per invention, are the subject of subordinate claims.

By means of a drawing, a closer description of the invention is given below. This drawing shows:

FIG. 1; A schematic cross-section and a partial longitudinal section of a flat collector of selective permeability to radiation.

FIG. 2; The curves pertaining to the light spectrum required for photosynthesis, and their approximation by a test-type collector.

FIG. 3; The curves of the light spectrum visible to the human eye, and their approximation by a test-type collector.

The flat collector per FIG. 1 consists of a panel-like hollow absorber plate 1 at the bottom side, and of a cover plate 3 at the top side. Both plates are held in a frame 4, made of sectional extrusion of plastics or light metal, so that the two plates contain a space 2, customarily filled with air, but that could also, be filled either with a gas inhibiting infrared radiation, or be evacuated.

The cover plate 3 can be made of glass, polycarbonates or similar material and be of flat or sectional design. It must be able to withstand wind pressures and, if evacuated, also the atmospheric pressure, as well as bear loads imposed by snow. As a sectional plate it can have its profilation in a longitudinal or lateral direction, in order to enhance the photothermic effect by providing a correction to the angle of incidence of sunlight, as it changes in the course of the day.

Absorber plate 1 is made of a fabricated plastics extrusion, permeable to radiation, unaffected by aging and temperatures, and resistant to chemical corrosion. Polycarbonates in particular, possess all required qualities, such as being unaffected by heat or cold, permeable to light within the visible and near ultraviolet ranges, having a surface quality of an attainable grade and an extremely high life on exposure to water and/or a high degree of humidity. According to FIG. 1 the absorber plate is a flat hollow body of rectangular section, the interior of which is divided into several longitudinal chambers 1.2 that are formed by ribs 1.1 connecting the upper and lower sides, the chambers being in communication at both face sides of the hollow body by means of tubular connectors 1.3. The flat collector or its absorber plate 1 respectively, are also linked by these connectors to the external liquid circuit. The connectors are also made of plastics, preferably polycarbonates, and have the purpose of distributing the circulation of the medium across the entire width of the plate in such a manner that uniform flow conditions prevail across its entire area. On sloping roofs, the flat collector will be installed so that chambers 1.2 are in the direction of the perpendicular, in order to attain a possibly linear velocity of flow across the entire width of the plate, utilizing the thermal effects of the liquid heated by incident radiation, in conjunction with the resistance encountered by its flow.

The light-selective flat collectors as per this invention are manufactured in a modular construction that will facilitate installation at any location. Tests have produced the following individual dimensions as being of advantage. Absorber plate 1, fabricated from polycarbonates by extrusion:
Thickness of wall and ribs: 0.5 mm–1.0 mm,
Interior dimensions of chambers 1.2: 5 mm–10 mm;
Ribs 1.1 afford an extraordinary rigidity to absorber plate 1.
Distance between absorber plate 1 and cover plate 3 (interior height of airspace 2): 10 mm–20 mm.

APPLICATION EXAMPLE 1

In the diagram of FIG. 2, the broken line represents the curve of the light spectrum required by plants for photosynthesis.

By the admixture of pure basic colors, as below, this curve can be reproduced as the filtering curve of a selectively-absorbent liquid contained within the absorber plate of the flat collector.
1 part of an organic green pigment, f.i., a Chlorophyll extract.
4 parts of an organic red pigment, f.i., in the form of Bordeaux red.
2 parts of an organic blue pigment.

These commercially available pigments are finely ground in the known manner, and rendered anti-static; strongly hygroscopic materials must be treated against formation of agglomerates.

The solid curve in FIG. 2 represents the distribution of spectral permeability, up to 700 mm coinciding to a very good degree with the spectral curve of photo-synthesis. A flat collector prepared in this manner will permit the transmission of all those parts of the spectrum that are required for the photo-synthesis of plants, while the remaining portions of the spectrum will be absorbed, converted into heat and conducted by the collector liquid into a heat storage from where it can be withdrawn in periods of demand. The light required by plants for photo-synthesis encompasses about 30% of the total incident light spectrum, and thus it may be possible to convert the remaining 70% into heat that can be utilized for the heating of greenhouses and forcing houses. Excess heat accruing during the summer months can be radiated off during nights or could be utilized for the heating of open spaces.

Flat collectors can be installed at no great expenditure below the glass roofs of existing greenhouses or incorporated as a module directly into a building structure. Since their coefficient of heat conductivity is also of a very low value, utilization of solar energy for these purposes is achieved in a most economical manner.

APPLICATION EXAMPLE 2

The partial spectrum visible at the human eye within radiation of the range of 325 mm to 800 mm, is represented in the diagram of FIG. 3 by the broken line. A good approximation of this spectrum, up to the value of 630 mm, could be achieved by a liquid to which color pigments were admixtured, in a ratio of, f.i.
2 parts of an inorganic red pigment, f.i. as derivative of ferric oxide,
4 parts of an organic green pigment,
9 parts of an organic blue pigment and
5 parts of an organic violet pigment.

Light visible to the human eye extends over about 35% of the total spectrum. 65% could thus be recuperated as heat. In the case of an open-air swimming pool, the heat could be led into it, directly by the liquid circuit, or via a heat storage. For this purpose, the flat collectors could be arranged as cantilevering roofs over areas used by visitors to lie down on the ground, and similar locations. A cover of this type will absorb the incidence of ultraviolet rays and thus reduce overheating of the body and prevent sunburn.

Flat collectors of identical type may also be used for indoor swimming pools, indoor sports spaces, etc.

Flat collectors, incorporated as parts of the outer shell, especially the roofing, of enclosed spaces such as greenhouses, forcing houses and halls, can be used as protection against dissipation of heat into the cold environment during periods when no energy is available for recuperation. The coefficient of heat conductivity of air is merely one quarter of that of water. The coefficient of an air-filled flat collector together with its cover plate will then approximate that of a triple thermal glazing. Evacuating absorber plate 1 to a value of, f.i., 10 Torr will further reduce the coefficient of heat conductivity by nearly one half.

Otherwise, flat collectors may also be operated at temperatures below the freezing point, provided a medium to inhibit freezing, non-corrosive to absorber plate 1 and also spectro-photometrically indifferent within the range of permeability, has been added.

I claim:
1. Method for the recuperation of heat in a partial range of the solar radiation spectrum between 325 and 800 nm wavelength by means of a hollow body permeable to the radiation, through which a liquid is circulated that selectively absorbs radiation in the chosen partial range comprising adding liquid color pigments to the liquid in soluble form or fine dispersion, concentration and mixing ratio of said liquid color pigments adjusted as best as possible for the transmission range of a given spectral curve, said liquid color pigments selected from an organic red pigment such as Bordeaux red or from an inorganic red pigment such as a derivative of ferric oxide and/or from an organic green pigment such as a chlorophyll extract and/or from an organic blue pigment and/or from an organic violet pigment wherein a mixture of said liquid color pigments added to said liquid is composed of 1 part of an organic green pigment; 4 parts of an organic red pigment; and 2 parts of an organic blue pigment, wherein said liquid color pigments are adjusted to the transmission range of a spectral curve having relative maxima of 50% transmission at 450 nm and 90% transmission at 680 nm, coinciding with the light spectrum required for photosynthesis, so that those parts of the spectrum not required for the photosynthesis of plants are absorbed, and further comprising the step of admixing to said liquid an antifreezing medium which is of a non-corrosive character to said hollow body and is photometrically indifferent within said further partial range of permeability.

2. A method as defined in claim 1; and further comprising the steps of circulating said liquid with said admixed pigment matter so that the recovered heat is carried out from said hollow body in a closed curcuit and conveyed to storing means.

3. A method as defined in claim 1, wherein said organic red pigment is a Bordeaux-red pigment.

4. A method as defined in claim 1, wherein said inorganic red pigment is a derivative of ferric oxide.

5. A method as defined in claim 1, wherein said organic green pigment is a chlorophyll extract.

6. Method for the recuperation of heat in a partial range of the solar radiation spectrum between 325 and 800 nm wavelength by means of a hollow body permeable to the radiation, through which a liquid is circulated that selectively absorbs radiation in the chosen partial range comprising adding liquid color pigments to the liquid in soluble form or fine dispersion, concentration and mixing ratio of said liquid color pigments adjusted as best as possible for the transmission range of a given spectral curve, said liquid color pigments selected from an organic red pigment such as Bordeaux red or from an inorganic red pigment such as a derivative of ferric oxide and/or from an organic green pigment such as a chlorophyll extract and/or from an organic blue pigment and/or from an organic violet pigment, wherein a mixture of said liquid color pigments added to said liquid is composed of 2 parts of an inorganic red pigment such as a derivative of ferric oxide;
4 parts of an organic green pigment;
9 parts of an organic blue pigment; and
5 parts of an organic violet pigment, wherein said liquid color pigments are adjusted to the transmission range of a spectral curve having relative maxima of 10% transmission at 375 nm and 90% transmission at 550 nm, coinciding with the light spectrum visible to the human eye, so that those parts of the spectrum not visible to the human eye are absorbed, and further comprising the step of admixing to said liquid an antifreezing medium which is of a non-corrosive character to said hollow body and is photometrically indifferent within said further partial range of permeability.

* * * * *